United States Patent
McLaughlin et al.

(10) Patent No.: US 8,406,220 B2
(45) Date of Patent: Mar. 26, 2013

(54) METHOD AND SYSTEM FOR INTEGRATION OF WIRELESS DEVICES WITH A DISTRIBUTED CONTROL SYSTEM

(75) Inventors: Paul F. McLaughlin, Ambler, PA (US); Tariq Samad, Minneapolis, MN (US); Alexander Chernoguzov, Warrington, PA (US)

(73) Assignee: Honeywell International Inc., Morristown, NJ (US)

( * ) Notice: Subject to any disclaimer, the term of this patent is extended or adjusted under 35 U.S.C. 154(b) by 1287 days.

(21) Appl. No.: 11/323,488

(22) Filed: Dec. 30, 2005

(65) Prior Publication Data

US 2007/0153677 A1 Jul. 5, 2007

(51) Int. Cl.
*H04L 12/28* (2006.01)
*H04L 12/56* (2006.01)
*H04L 12/54* (2006.01)

(52) U.S. Cl. .................. 370/351; 370/401; 370/428

(58) Field of Classification Search .................. 370/310, 370/218, 225, 331; 455/404.1, 403; 707/104.1; 713/177; 709/203; 73/866
See application file for complete search history.

(56) References Cited

U.S. PATENT DOCUMENTS

| | | | | |
|---|---|---|---|---|
| 5,749,053 A * | 5/1998 | Kusaki et al. | ................. | 455/524 |
| 6,192,232 B1 * | 2/2001 | Iseyama | ................. | 455/404.1 |
| 6,256,297 B1 * | 7/2001 | Haferbeck et al. | ............ | 370/310 |
| 6,427,071 B1 * | 7/2002 | Adams et al. | ................. | 455/403 |
| 6,631,416 B2 * | 10/2003 | Bendinelli et al. | ............ | 709/227 |
| 6,850,486 B2 * | 2/2005 | Saleh et al. | ................. | 370/218 |
| 6,917,584 B2 * | 7/2005 | Kuwabara | ................. | 370/225 |
| 6,976,177 B2 * | 12/2005 | Ahonen | ................. | 726/3 |
| 7,236,987 B1 * | 6/2007 | Faulkner et al. | ............ | 707/104.1 |
| 7,275,157 B2 * | 9/2007 | Cam Winget | ................. | 713/168 |
| 7,308,431 B2 * | 12/2007 | Asokan et al. | ................. | 705/67 |
| 7,457,322 B1 * | 11/2008 | Flood et al. | ................. | 370/503 |
| 7,483,697 B2 * | 1/2009 | Ohki | ................. | 455/432.1 |
| 7,813,510 B2 * | 10/2010 | Fu | ................. | 380/279 |
| 7,881,253 B2 * | 2/2011 | Budampati et al. | ............ | 370/328 |
| 7,900,242 B2 * | 3/2011 | Malinen et al. | ................. | 726/6 |
| 8,204,078 B2 * | 6/2012 | McLaughlin | ................. | 370/466 |
| 2002/0107001 A1 * | 8/2002 | Nishida et al. | ................. | 455/410 |
| 2003/0003912 A1 * | 1/2003 | Melpignano et al. | ......... | 455/436 |
| 2003/0005149 A1 * | 1/2003 | Haas et al. | ................. | 709/238 |
| 2003/0031151 A1 * | 2/2003 | Sharma et al. | ................. | 370/338 |
| 2003/0061481 A1 * | 3/2003 | Levine et al. | ................. | 713/163 |
| 2003/0076958 A1 * | 4/2003 | Ishiguro et al. | ............ | 380/277 |

(Continued)

FOREIGN PATENT DOCUMENTS

EP 1081895 A1 * 3/2001
EP 1439667 A2 * 7/2004

OTHER PUBLICATIONS

"XYR 5000 Wireless Transmitters, Honeywell Solutions for Wireless Data Acquisiton and Monitoring," www.acs.honeywell.com, Feb. 2006, 6 pages.

*Primary Examiner* — Marsha D. Banks Harold
*Assistant Examiner* — Christopher Wyllie (57) ABSTRACT

A method includes determining first and second communication paths from a leaf node of a plurality of leaf nodes to first and second gateway nodes, respectively, of a plurality of gateway nodes. The first and second communication paths may include first and second intermediate nodes, respectively, of a plurality of intermediate nodes. A wireless message is sent from the leaf node to the first and second gateway nodes via the first and second communication paths, respectively. Information in the wireless message is communicated from at least one of the first and second gateway nodes to a component of a process control system.

21 Claims, 6 Drawing Sheets

U.S. PATENT DOCUMENTS

| | | | |
|---|---|---|---|
| 2003/0123394 A1* | 7/2003 | Neale et al. | 370/235 |
| 2003/0163704 A1* | 8/2003 | Dick et al. | 713/178 |
| 2004/0010694 A1* | 1/2004 | Collens et al. | 713/177 |
| 2004/0083833 A1* | 5/2004 | Hitt et al. | 73/866 |
| 2004/0090972 A1* | 5/2004 | Barrett et al. | 370/401 |
| 2004/0156374 A1* | 8/2004 | Lee et al. | 370/401 |
| 2005/0041675 A1* | 2/2005 | Trostle et al. | 370/401 |
| 2005/0254653 A1* | 11/2005 | Potashnik et al. | 380/270 |
| 2006/0083200 A1* | 4/2006 | Emeott et al. | 370/331 |
| 2006/0198370 A1* | 9/2006 | Haddad et al. | 370/389 |
| 2006/0282498 A1* | 12/2006 | Muro | 709/203 |
| 2007/0008880 A1* | 1/2007 | Buchko et al. | 370/218 |
| 2007/0149200 A1* | 6/2007 | Sharaga | 455/439 |
| 2007/0153677 A1* | 7/2007 | McLaughlin et al. | 370/216 |
| 2007/0155423 A1 | 7/2007 | Carmody et al. | |
| 2008/0232382 A1* | 9/2008 | Iwama et al. | 370/401 |
| 2009/0034441 A1* | 2/2009 | Budampati et al. | 370/310 |
| 2010/0269005 A1* | 10/2010 | Budampati et al. | 714/746 |
| 2011/0258433 A1* | 10/2011 | Pulini et al. | 713/153 |

* cited by examiner

METHOD AND SYSTEM FOR INTEGRATION
OF WIRELESS DEVICES WITH A
DISTRIBUTED CONTROL SYSTEM

TECHNICAL FIELD

This disclosure relates generally to distributed control systems and more specifically to a method and system for integration of wireless devices with a distributed control system.

BACKGROUND

A process plant is a complex, multifaceted entity, a structured organization of physical elements, operated for economic and other criteria that are often industry-specific. A process plant has a number of different stakeholders who can affect and/or are affected by its operation. Critical to the operation of many process plants today is a process control system, which ensures that appropriate parameters are measured and actions taken, plant personnel are kept informed, abnormal situations are identified and addressed, and business processes are integrated. Automation and control systems are employed in diverse applications, such as refining and petrochemical plants, the petroleum and natural gas supply chain, pulp and paper manufacturing, electrical power generation, chemical production, food production, wastewater treatment, discrete product manufacturing, cable-laying ships, tunnel ventilation control, and mining operations.

In many process control applications the cost of running wires from nodes such as sensors, actuators and user interfaces to the process control system limits the number and location of such nodes initially deployed. Cost and difficulty of wiring installation may also limit the deployment of additional nodes in an already-functioning plant. The recent development of wireless communication technologies—such as Bluetooth, IEEE® 802.11, RFID and others-promise a solution to such wiring costs, but not without introducing new challenges to the reliability and security of a process control system.

The ambient environment of a process plant may interfere with or prevent wireless communication between a sensor, actuator or user interface location and the process control system, making it difficult to connect a wireless node. Individual messages may be lost, or changes to the physical plant or electrical environment may prevent communication where it was previously possible, resulting in unreliable communication. Security is also an issue with wireless communication. Outside parties may intercept, alter or jam wireless communications, or use wireless communication devices to gain access to resources and information of the process control system.

SUMMARY

This disclosure provides a method and system for integrating wireless devices with a distributed control system.

In a first embodiment, a method includes determining a first communication path from a leaf node of a plurality of leaf nodes to a first gateway node of a plurality of gateway nodes. The method also includes determining a second communication path from the leaf node to a second gateway node of the plurality of gateway nodes. The method further includes sending a wireless message from the leaf node to the first and second gateway nodes via the first and second communication paths, respectively. The wireless message includes message information. The method includes communicating the message information from one or both of the first and second gateway nodes to a process control system component.

In particular embodiments, the first communication path is determined via a first intermediate node of a plurality of intermediate nodes, and the second communication path is determined via a second intermediate node of the plurality of intermediate nodes. The wireless message is sent to the first and second gateway nodes via the first and second intermediate nodes, respectively.

In a second embodiment, a system includes a plurality of gateway nodes and a plurality of leaf nodes. The gateway nodes are capable of communicating with a process control system and communicating wirelessly with a leaf node. The leaf nodes are capable of communicating wirelessly with a gateway node. A leaf node of the plurality of leaf nodes and a first gateway node of the plurality of gateway nodes are capable of exchanging wireless messages to determine a first communication path from the leaf node to the first gateway node. The leaf node and a second gateway node of the plurality of gateway nodes are also capable of exchanging wireless messages to determine a second communication path from the leaf node to the second gateway node. The leaf node is also capable of sending a wireless message to the first and second gateway nodes via the first and second communication paths, respectively. The wireless message includes message information. One or both of the first and second gateway nodes is also capable of communicating the message information to the process control system component.

In particular embodiments, the system also includes a plurality of intermediate nodes. The intermediate nodes are capable of communicating wirelessly with a gateway node and with a leaf node. A first intermediate node of the plurality of intermediate nodes is also capable of exchanging wireless messages with the leaf node and the first gateway node to determine the first communication path from the leaf node to the first gateway node via the first intermediate node. A second intermediate node of the plurality of intermediate nodes is further capable of exchanging wireless messages with the leaf node and the second gateway node to determine the second communication path from the leaf node to the second gateway node via the second intermediate node. The leaf node is also capable of sending the wireless message to the first and second gateway nodes via the first and second intermediate nodes, respectively.

In a third embodiment, a system includes a process data consumer, a key server, a plurality of gateway nodes, a plurality of intermediate nodes, and a plurality of leaf nodes. The gateway nodes are capable of communicating with the process data consumer and communicating wirelessly with an intermediate node and a leaf node. The intermediate nodes are capable of communicating wirelessly with a gateway node and with a leaf node. The leaf nodes are capable of communicating wirelessly with an intermediate node and a gateway node. The process data consumer is capable of sending a subscription message to first and second gateway nodes of the plurality of gateway nodes. The subscription message identifies a leaf node of the plurality of leaf nodes, requests information supplied by the identified leaf node, and requests that the information be published at a first rate.

The leaf node is capable of loading a security key created by the key server. The leaf node is also capable of, at a second rate, repeatedly encrypting current leaf node information using the security key and sending a wireless message to the first and second gateway nodes via first and second intermediate nodes of the plurality of intermediate nodes, respectively. The wireless message includes the encrypted leaf node information. The first and second gateway nodes are capable of receiving the wireless messages sent by the leaf node at the second rate, decrypting the encrypted leaf node information using the key server, and sending the decrypted leaf node information to the process data consumer at the first rate.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
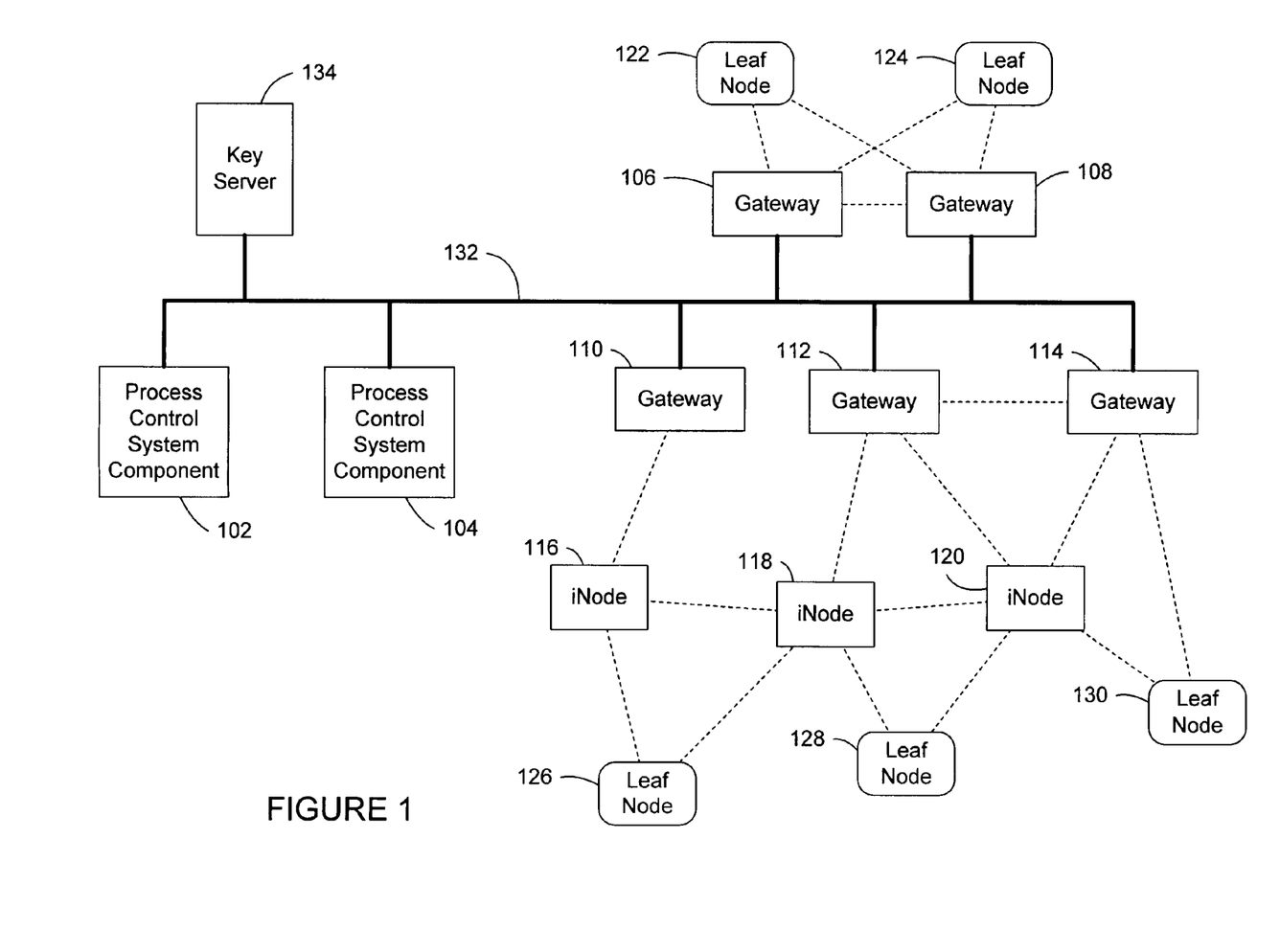
FIG. 1 illustrates an example system for distributed process control system according to one embodiment of this disclosure.

FIG. 1 illustrates an example system 100 for process control according to one embodiment of this disclosure. The embodiment of the system 100 shown in FIG. 1 is for illustration only. Other embodiments of the system 100 could be used without departing from the scope of this disclosure.

In this example, the system 100 includes process control system components 102 and 104 communicating via a network 132. The network 132 may be Ethernet, FAULT TOLERANT ETHERNET, or other suitable network. The system 100 also includes gateway nodes 106-114, which communicate with each other and with the process control system components 102 and 104 via network 132. Gateway nodes may also communicate wirelessly with each other. Wireless communication paths are indicated in FIG. 1 by dashed lines. Intermediate nodes 116-120, also referred to as iNodes, are able to communicate wirelessly with gateway nodes and with each other. Leaf nodes 122-130 are able to communicate wirelessly with gateway nodes and with intermediate nodes. The system 100 also includes a key server 134 that participates, as will be described later, in the authentication of the gateway nodes 106-114, the intermediate nodes 116-120 and the leaf nodes 122-130, and in secure communication between the leaf nodes 122-130 and the process control system components 102 and 104.

The process control system components 102 and 104 may be process controllers, which both send and receive information to the leaf nodes 122-130. The process control system components 102 and 104 may also be process data consumers, e.g., components that only consume process data sent by the leaf nodes 122-130. Such components include man-machine interfaces and plant historians, among others. Process controllers are also process data consumers.

The leaf nodes 122-130 may be wireless versions of sensors, actuators, or other devices that are typically coupled to a process controller or process data consumer by a wired connection. The leaf nodes 122-130 may also be wireless user interface devices, such as displays or control panels. The leaf nodes 122-130 may also be devices not currently used with non-wireless process control systems, such as portable computers, personal digital assistants, or mobile sensors or actuators.

As shown in FIG. 1, the wireless devices of a distributed control system according to the present disclosure may be grouped into separate networks by physical proximity or by frequency allocation. For example, the leaf nodes 122 and 124 and the gateway nodes 106 and 108 form a subnetwork that is separate from the subnetwork formed by the gateway nodes 110-114, the intermediate nodes 116-120, and the leaf nodes 126-130. Where leaf nodes are distributed over a large area, gateway nodes and iNodes may be physically located to provide wireless communication with all leaf nodes. In the alternative, where a large number of leaf nodes are located close to each other, the leaf nodes may be separated into subnetworks by frequency allocation to prevent the high volume of wireless traffic from, for example, increasing the latency of messages sent from a process controller to an actuator or reducing the rate at which a sensor can supply updated information to a process control system component.

Preferably, when the system 100 is installed, each leaf node 122-130 will be bound to a specified pair of the gateway nodes 106-114. In this way, the process of finding a communication path between the leaf node and each of its gateway nodes may be made more efficient and a fixed mapping of leaf nodes to gateways may be stored in a node connected to network 132 for quick access by any process control system component seeking to establish communication with a leaf node. In the alternative, leaf nodes may determine communication paths to any two gateway nodes that may be reached, and those gateway nodes then report that they can provide communication to that leaf node.

It can also be seen from FIG. 1 that redundant wireless communication pathways are provided where possible, to improve the reliability of communication between process control system components and leaf nodes. While some intermediate nodes in FIG. 1 are only able to communicate wirelessly with a single gateway node (for example the iNode 116 and the gateway node 110), a wireless communication network according to the present disclosure typically enables each leaf node to communicate with two or more iNodes and with two or more gateway nodes. In this way, single points of failure in the process control system are reduced or eliminated.

Figure 2:
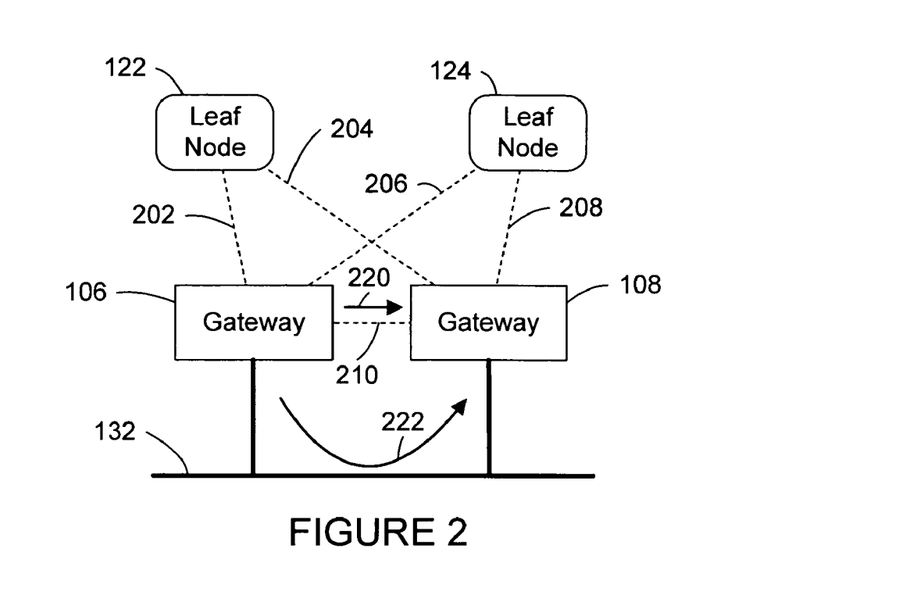
FIG. 2 illustrates an example information flow in a portion of the example system of FIG. 1.

FIG. 2 illustrates an example information flow in a portion of the example system of FIG. 1. The leaf node 122 wirelessly communicates with the gateway node 106 via a wireless link 202, and with the gateway node 108 via a wireless link 204. Similarly, the leaf node 124 wirelessly communicates with the gateway node 106 via a wireless link 206, and with the gateway node 108 via a wireless link 208. In a wireless communication system according to the present embodiment, where the leaf nodes 122 and 124 are sensors, they send their information to both the gateway nodes 106 and 108. In this way, the gateway node 106 or 108 form a redundant pair and the process control system components 102 and 104 may receive the leaf node information from either gateway node.

However, the process control system component 102, for example, may have a path over the network 132 to only the gateway node 108. Where the information from leaf node 122, for example, is sent as a series of packets, temporary dropouts, interference or other problems with the wireless signal may cause some packets to be received by the gateway node 106, but not by the gateway node 108. Without more, the missing packets in the gateway node 108 would prevent the process control system component 102 from obtaining the information from leaf node 122.

In a system according to the present disclosure, the gateway nodes 106 and 108 exchange all information received from leaf nodes, enabling the gateway node 108 to supplement the packets that it received with the packets received only by the gateway node 106, in order to fill in any packets not received due to dropouts, interference or other wireless communication problems. In FIG. 2, this exchange may be made via a wireless path 210 between the gateway nodes 106 and 108, as indicated by arrow 220. In the alternative, the exchange may be made via the network 132, as indicated by arrow 222. By way of this exchange of received packets, the process control system component 102 has access in the gateway node 108 to the complete information from leaf node 122.

Figure 3:
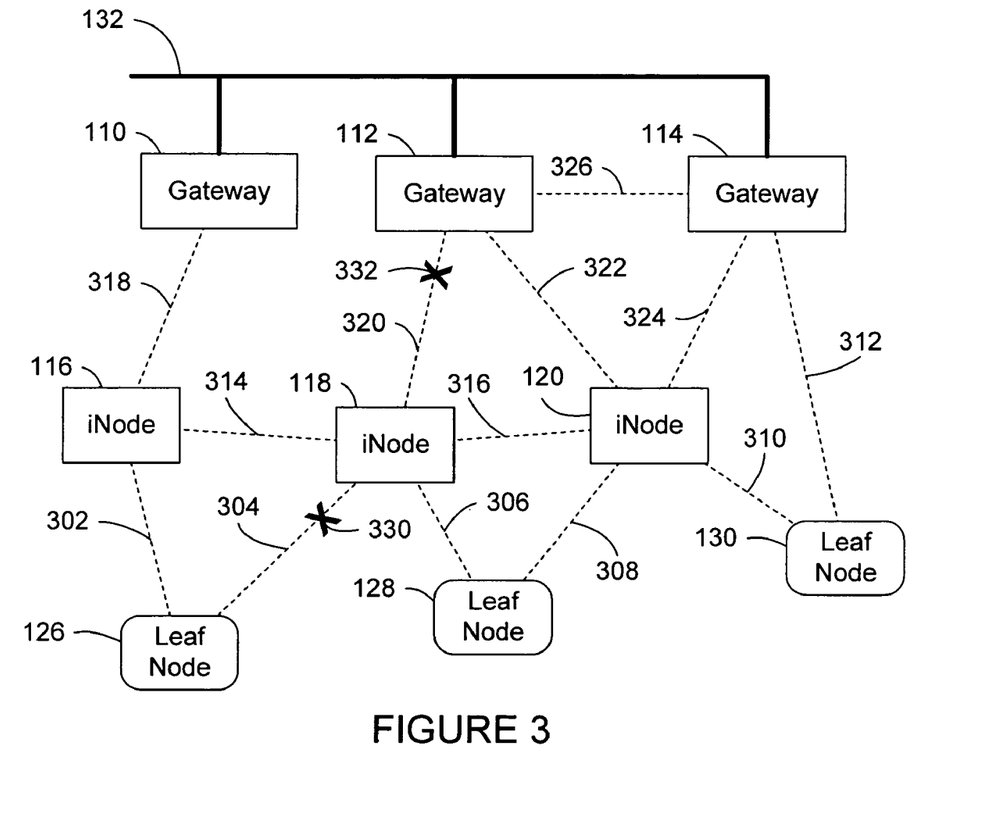
FIG. 3 illustrates interrupted wireless communications in a portion of the example system of FIG. 1.

FIG. 3 illustrates interrupted wireless communications in a portion of the example system of FIG. 1. As described with reference to FIG. 1, a system according to the present embodiment attempts to provide wireless communication paths from each of leaf nodes 126-130 to at least two of the gateway nodes 110-114. For example, the leaf node 126 exchanges wireless messages with the iNodes 116 and 118, which in turn exchange wireless messages with the gateway nodes 110 and 112 to determine communication paths from the leaf node 126 to the gateway nodes 110 and 112. The leaf node 126 communicates with the gateway node 110 via the iNode 116 using wireless links 302 and 318. The leaf node 126 communicates with the gateway node 112 via the iNode 118 using wireless links 304 and 320.

Because the determining of a new communication path may be a lengthy process, when compared to the rate at which information is sent to or received from the leaf node 126, these communication paths are determined before the leaf node 126 begins sending data to or receiving data from the process control system components 102 and 104. In this way, even if one of the communication paths fails, the leaf node can continue communicating using the other communication path, without delaying communications while a new path is determined. For similar reasons, upon the failure of one of the two communication paths, the system 100 begins the process of determining a replacement path. As soon as a replacement path is determined, the leaf node 126 begins communicating via the replacement path, as well as via the original path that is still working.

For example, if the wireless link 304 fails, as indicated at 330, a new communication path to the gateway node 112 may be determined via the iNodes 116 and 118 using wireless links 302, 314 and 320. While such a replacement communication path would allow the leaf node to send information to both the gateway nodes 110 and 112, the system 100 now has two single points of failure for communication with the leaf node 126: the wireless link 302 and the intermediate node 116. As such, the system 100 may generate a notice to a system operator identifying the failed wireless link and warning that fully redundant communication pathways can no longer be established.

In another example, from the leaf node 128, communication paths may be determined to the gateway node 112 via wireless links 306 and 320 and to the gateway node 114 via wireless links 308 and 324. If the wireless link 320 fails, as indicated at 332, a new communication path may be determined that terminates in the gateway node 110 via the iNodes 118 and 116 using wireless links 306, 314 and 318. In such a situation, process control system component communicating with the leaf node 128 via the gateway node 112 would be notified of the change and would re-establish communication with the leaf node 128 via either the gateway node 110 or 114.

Figure 4:
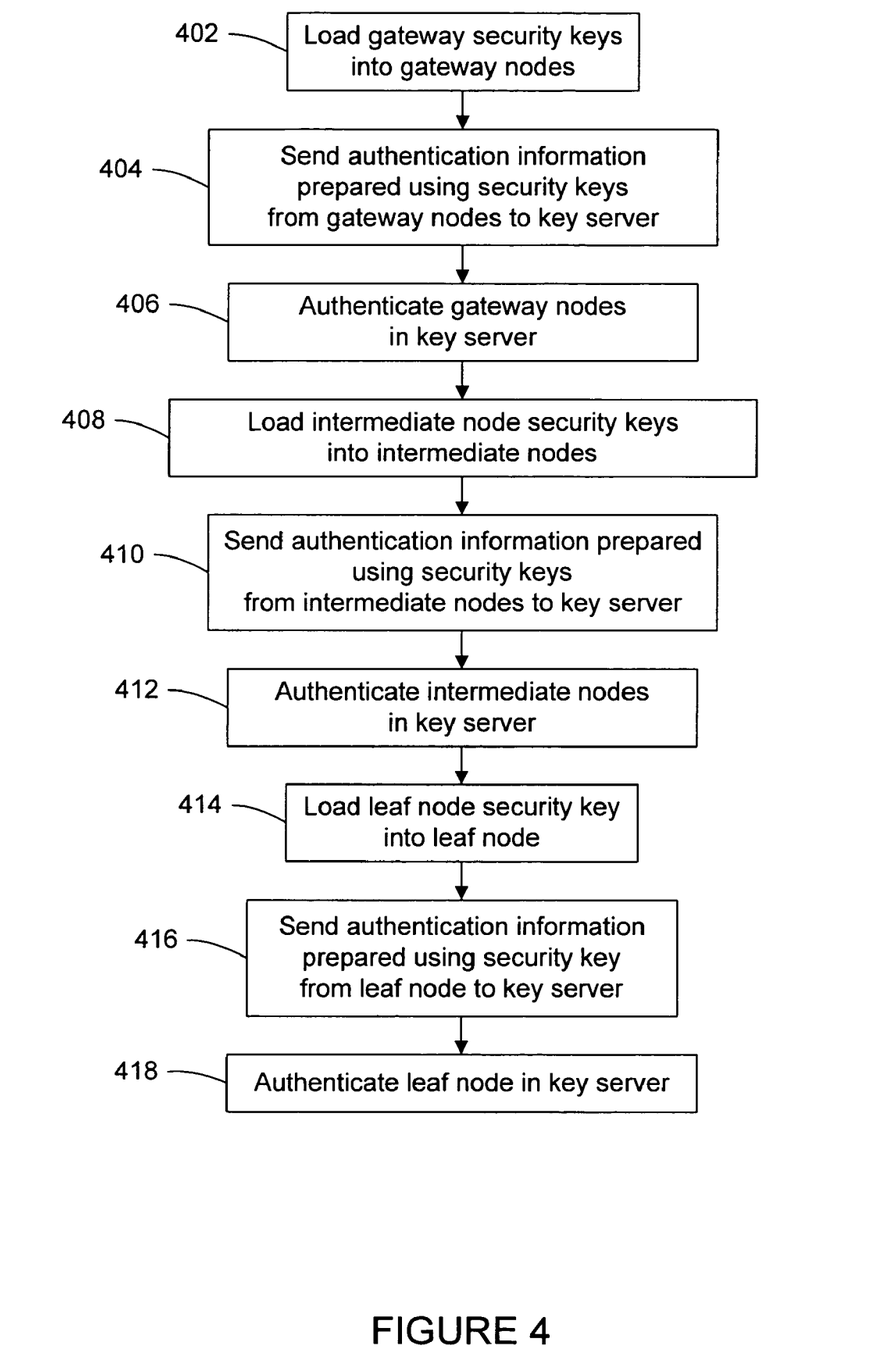
FIG. 4 illustrates an example method for authenticating wireless devices according to one embodiment of this disclosure.

FIG. 4 illustrates an example method 400 for authenticating wireless devices according to one embodiment of this disclosure. In this way, the system 100 is made more secure by preventing unauthorized wireless devices from transmitting to authorized wireless devices of the system 100.

The method 400 begins at step 402 with loading a gateway security keys into each of the gateway nodes 106-114. The key server 134 may generate individual security keys for each gateway node. In one example method according to the present disclosure, the security keys are first loaded into a portable device, such as a so-called 'keyfob', capable of wired or secure point-to-point wireless communication with the key server 134 and the gateway nodes 106-114. Such secure point-to-point wireless communication might be provided by low power, line-of-sight infrared communication, for example. A technician may then take the keyfob to each of the gateway nodes 106-114 and load the gateway node with its security key. The key server 134 may subsequently confirm with the keyfob that each of the gateway nodes 106-114 was loaded with its security key.

The method 400 continues at step 404 with each of the gateway nodes 106-114 preparing authentication information using their individual security keys and sending that authentication information to the key server 134 via the network 132. In step 406 the key server 134 authenticates the gateway nodes 106-114 by examining the authentication information received from each node, using each node's individual security key. Once the gateway nodes 106-114 have been authenticated, subsequent communications between the gateway nodes 106-114 and the key server 134 are trusted communications, and the gateway nodes 106-114 may be used in the authentication of the intermediate nodes 116-120 and the leaf nodes 122-130.

Using similar procedures to those used in step 402, in step 408, individual security keys are loaded into the iNodes 116-120. In step 410, the iNodes 116-120 prepare authentication information using their security keys and send the authentication information to the key server 134. The key server 134 authenticates the iNodes 116-120 in step 412, by evaluating the received authentication information using the individual security keys assigned. Once the intermediate nodes 116-120 have been authenticated, they too are trusted and can participate with the gateway nodes 106-114 in the authentication of the leaf nodes 122-130.

In a similar fashion, in step 414, each of leaf nodes 122-130 is loaded with its individual security key. In step 416, the leaf node prepares and sends authentication information using its security key. Finally, in step 418, the key server 134 authenticates each of the leaf nodes 122-130. At this point, all authorized wireless devices in the system 100 are authorized and greater security for the wireless communication is obtained.

In alternative procedures according to the present embodiment, intermediate nodes and leaf nodes may be brought into physical proximity to the key server and loaded with their individual security keys directly from the key server, either by wireless or non-wireless methods. In such a procedure, the wireless devices may be kept in secure storage until deployed in the system 100 and authenticated by sending authentication information to the key server, as described above.

Figure 5:
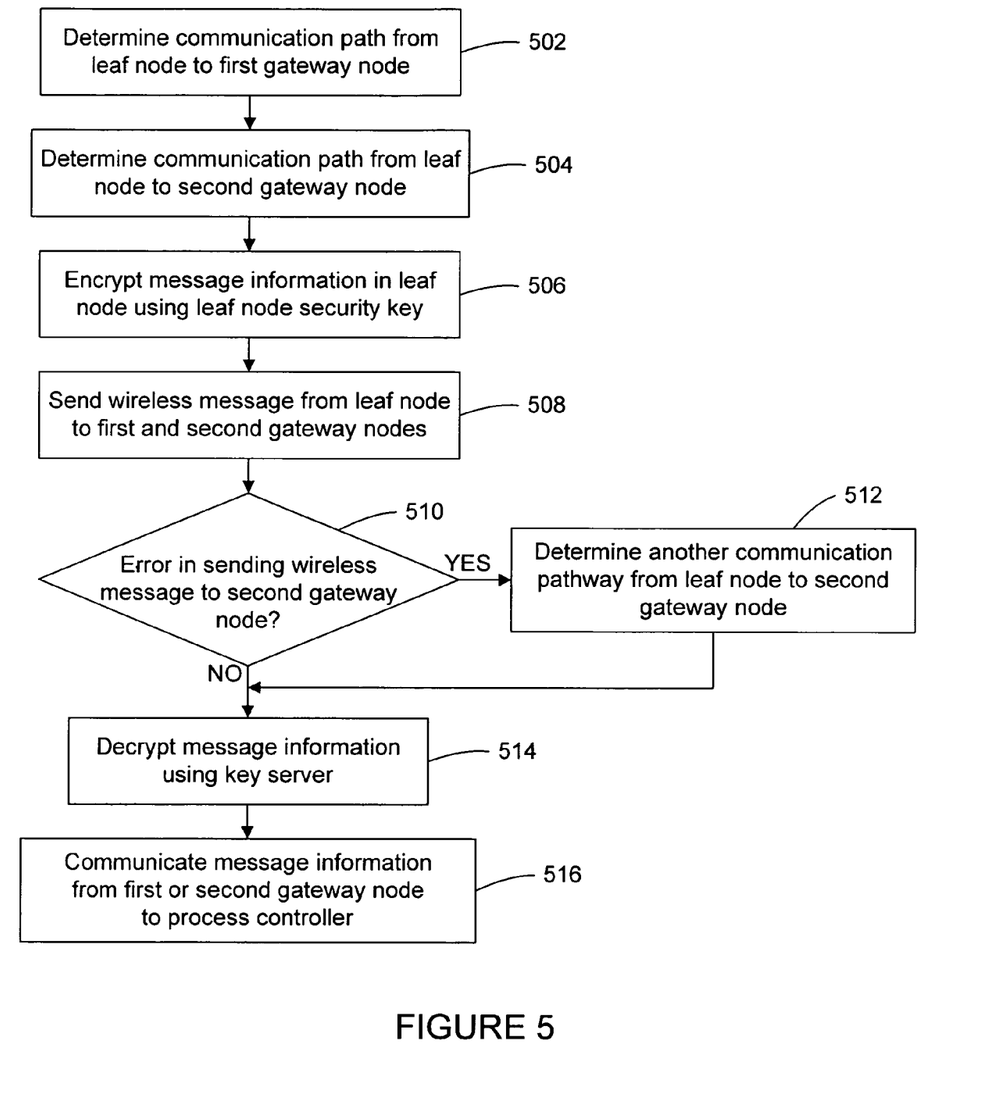
FIG. 5 illustrates an example method for communicating information from a leaf node to a process control system component according to one embodiment of this disclosure.

As described with reference to FIGS. 1-3, the system 100 according to the present embodiment attempts to provide redundant communication paths between the leaf nodes 122-130 and the process control system components 102 and 104. FIG. 5 illustrates an example method 500 for communicating information from a leaf node to a process control system component according to one embodiment of this disclosure.

The method 500 begins in step 502 with determining a first communication path from a leaf node, for example the leaf node 130, to a first gateway node. The leaf node may exchange wireless messages directly with the gateway node, for example, as between the leaf node 130 and the gateway node 114. In the alternative, the communication path may be determined by the leaf node exchanging wireless messages with an intermediate node, which in turn exchanges wireless messages with a gateway node, for example, as between the leaf node 130, the iNode 120, and the gateway node 112.

In a similar way, in step 504, a second communication path is determined between the leaf node 130 and a second gateway node. The second communication path is preferably determined to be non-overlapping with the first communication path. That is, the intermediate nodes and wireless links participating in the second communication path are preferably different than those participating in the first communication path. In this way, a failure in a wireless link or intermediate node of one communication path does not prevent the continued functionality of the other communication path. If security keys have been distributed to the leaf nodes, as described with reference to FIG. 4, then in step 506 the leaf node encrypts its information using its security key. Regardless of whether the leaf node information is encrypted, the method 500 continues in step 508 with the leaf node sending its information to the first and second gateways using the first and second communication paths determined in steps 502 and 504.

In step 510, the first and second gateways, any intervening iNodes, and the leaf node determine whether an error was encountered in sending the wireless message to one of the gateway nodes, for example the second gateway node. If such an error was encountered, the same processes followed in steps 502 and 504 are again performed in step 512 to determine an alternate communication path from the leaf node to the second gateway. In this way, the failed communication path between the leaf node and the second gateway is replaced with a working communication path.

At the same time as the alternate communication path is being determined in step 512, if the leaf node information is encrypted, the method 500 continues in step 514 with the first and second gateways using the key server 134 to decrypt the leaf node information in the received message. Preferably, the intermediate nodes are unable to decrypt the leaf node information in messages passing through them. Regardless of whether the leaf node information was encrypted, the method 500 terminates in step 516 with the first and/or second gateway node communicating the leaf node information from the received message to any process control system component that has subscribed to receive the information.

While the example method 500 describes communicating information from a leaf node to a process control system component, it will be understood that a similar method may be used to communicate information from a process control system component to a leaf node. The information may be encrypted by a gateway node, using the key server, before being sent to the leaf node and decrypted by the leaf node. The information may be sent by two gateway nodes to the leaf node via two determined, non-overlapping communication paths to ensure reliable arrival at the leaf node. A failure of one of the communication paths may be sensed and an alternative path to the leaf node from the affected gateway found. Where wireless messages from both gateway nodes are received by the leaf node, the leaf node may use additional information from the message to prevent responding twice to duplicate messages.

Figure 6:
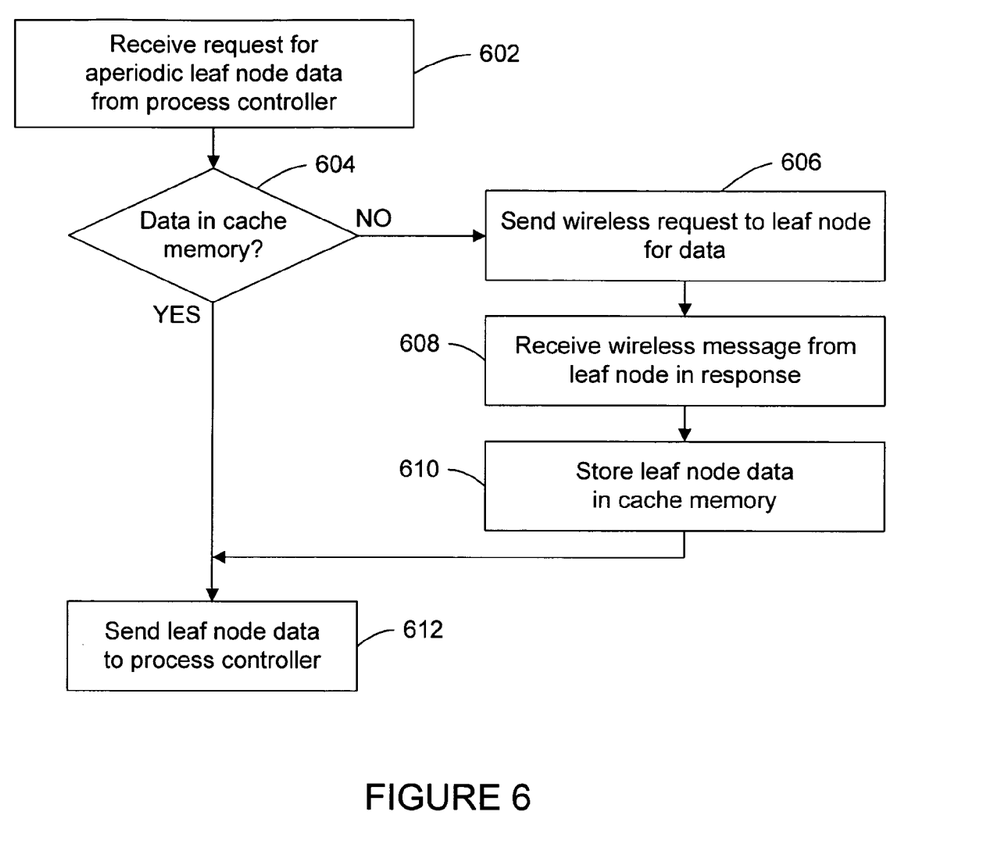
FIG. 6 illustrates an example method for caching aperiodic information provided by a leaf node to a process data consumer according to one embodiment of this disclosure.

Some information communicated between a process control system component and a leaf node is periodic information such as the numeric value of a sensor, the commanded position of an actuator, or data for display in a human interface device. Other information is aperiodic, such as leaf node configuration data. FIG. 6 illustrates an example method 600 for caching aperiodic information provided by a leaf node to a process data consumer according to one embodiment of this disclosure.

The method 600 begins in step 602 with a process data consumer requesting an item of aperiodic information for a particular leaf node from a gateway node in communication with the leaf node. In step 604, the gateway node determines whether the information is stored in cache memory associated with the gateway node. If not, the method 600 continues in step 606 with the gateway node sending a wireless request for the information to the leaf node via a predetermined communication path such as those determined in the steps 502 and 504 of the method 500. In step 608, the gateway node receives the information sent in response by the leaf node. As described with reference to FIG. 2, the information may be received directly from the leaf node or indirectly, via the gateway node's redundant pair gateway node. In step 610, the information received from the leaf node is stored into the cache memory.

If the information requested by the process data consumer was found in the gateway node cache memory in step 604, it may be retrieved from the cache memory and sent to the process data consumer in step 612. If the information requested by the process data consumer was not found in the gateway node cache memory in step 604, it may be retrieved from the message received from the leaf node or retrieved from the cache memory and sent to the process data consumer in step 612.

Figure 7:
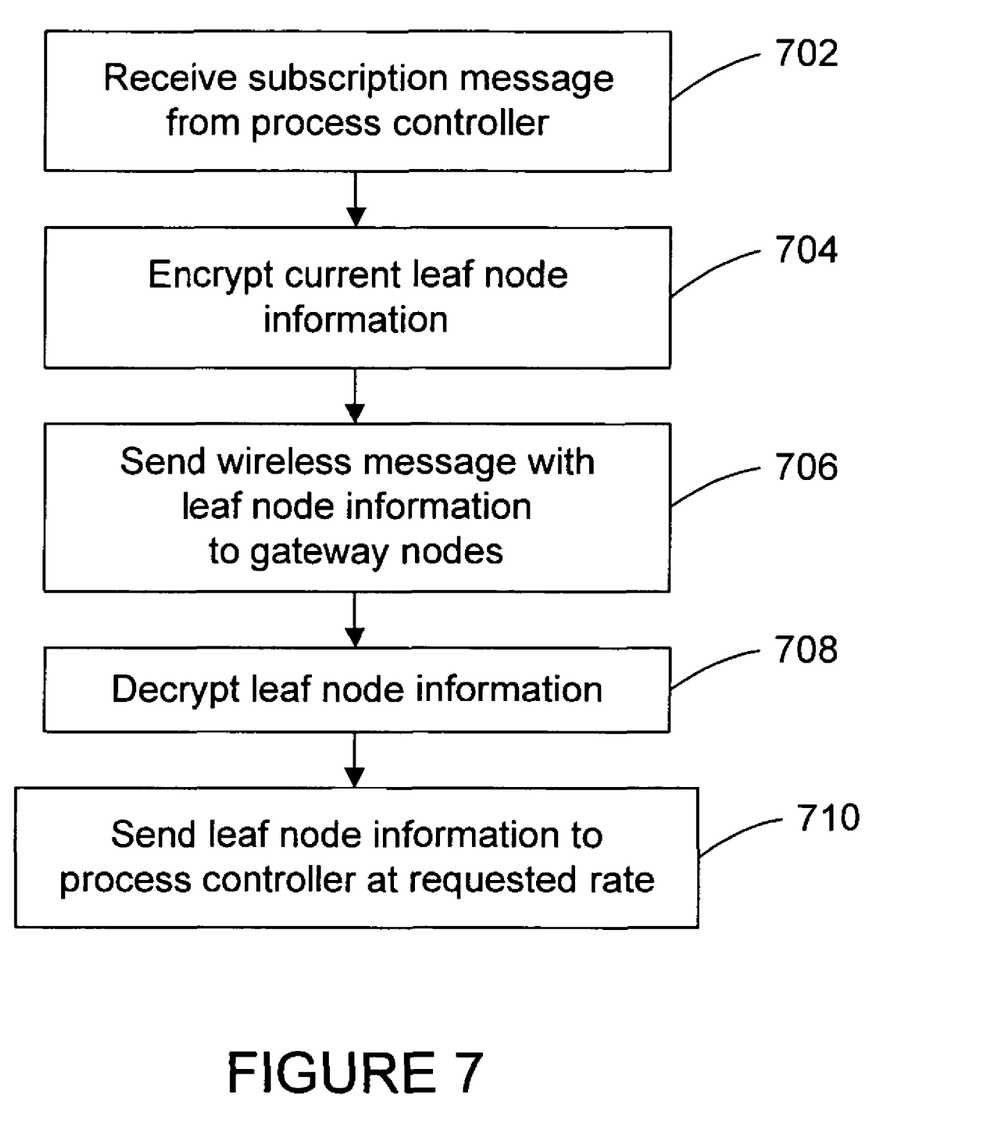
FIG. 7 illustrates an example method for providing information published by a leaf node at a first rate to a process data consumer at a second rate, according to one embodiment of this disclosure.

The system 100 may configure a sensor leaf node to send its current value at one-second intervals, because certain elements of the system 100 require the information at that rate. In contrast, a process data consumer may only need to read the value at five-second intervals in order to control an associated actuator appropriately. FIG. 7 illustrates an example method 700 for providing information published by a leaf node at a first rate to a process data consumer at a second rate, according to one embodiment of this disclosure.

The method 700 begins in step 702 with a process data consumer sending a subscription message requesting a periodic update at a specified rate of an item of information from a particular leaf node. The process data consumer sends the subscription request to a first gateway node in communication with the leaf node. If security keys have been distributed to the leaf nodes, as described with reference to FIG. 4, then in step 704 the leaf node encrypts its information using its security key. Regardless of whether the leaf node information is encrypted, the method 700 continues in step 706 with the leaf node sending its information to the first and second gateways using the first and second communication paths determined in steps 502 and 504. As described with reference to FIG. 2, the information may be received at the first gateway node directly from the leaf node or indirectly, via the second gateway node.

If the leaf node information is encrypted, the method 700 continues in step 708 with the first gateway using the key server 134 to decrypt the leaf node information in the received message. Regardless of whether the leaf node information was encrypted, the method 700 terminates in step 710 with the first gateway node communicating the leaf node information from the received message to the process data consumer at the requested update rate.

While the example system and methods according to the present disclosure described above depict a leaf node determining two communication paths to two gateway nodes, it will be understood that other numbers of communication paths may be determined to other numbers of gateway nodes without departing from the scope of the present disclosure. For example, two or more non-overlapping communication paths to a single gateway node may be determined, in order to provide redundancy and reliability despite a failure in the intermediate node or nodes and wireless links of any one of the determined communication paths. Similarly, three or more communication paths may be determined to three or more corresponding gateway nodes to provide even greater reliability than that provided by two communication paths and gateway nodes.

As used herein, the term "wireless" communication indicates the transmission of data via an ambient medium, for example, air. A non-wireless communication includes a communication achieved by transmission of data via a conduit, channel, or other defined communication path. Examples of such defined communication paths for non-wireless communication include copper or other conductive wires, optical fibers, coaxial and other cables, and any of a plethora of other known (or to be developed) communication or transmission lines. No specific structure is implied by either term (wireless or non-wireless), nor is the use of a particular band of frequencies, wavelengths, bit rates, or modulation protocol implied.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   loading first and second gateway security keys into first and second gateway nodes, respectively, by a key server;
   communicating to the key server first and second gateway authentication information from the first and second gateway nodes, respectively, wherein the first and second gateway authentication information is prepared using the first and second gateway security keys, respectively;
   authenticating the first and second gateway nodes at the key server using the first and second gateway authentication information, respectively;
   loading a leaf node security key into a leaf node by the key server;
   communicating leaf node authentication information from the leaf node to the key server via at least one of the first and second gateway nodes, wherein the leaf node authentication information is prepared using the leaf node security key;
   authenticating the leaf node at the key server using the leaf node authentication information;
   receiving a subscription message from a process data consumer at one or more of the first and second gateway nodes, the subscription message identifying the leaf node and requesting that information supplied by the leaf node be published at a first rate;
   determining first and second communication paths from the leaf node to the first and second gateway nodes, respectively;
   repeatedly encrypting leaf node information using the leaf node security key and sending, at a second rate, wireless messages from the leaf node to the first and second gateway nodes via the first and second communication paths, respectively, wherein the wireless messages comprise the encrypted leaf node information;
   receiving, by at least one of the first and second gateway nodes, the wireless messages sent by the leaf node at the second rate;
   decrypting, at one or more of the first and second gateway nodes, the encrypted leaf node information; and
   communicating, by the one or more of the first and second gateway nodes, the decrypted leaf node information to the process data consumer at the first rate.

2. The method of claim 1, wherein: determining the first and second communication paths comprises determining the first communication path via a first intermediate node and determining the second communication path via a second intermediate node; and sending the wireless messages from the leaf node to the first and second gateway nodes comprises sending the wireless messages via the first and second intermediate nodes, respectively.

3. The method of claim 2, wherein:
   determining the second communication path further comprises determining the second communication path via a third intermediate node; and
   sending the wireless messages from the leaf node to the second gateway node further comprises sending at least some of the wireless messages via the third intermediate node.

4. The method of claim 2, wherein, in response to an error in sending at least one of the wireless messages from the leaf node to the second gateway node via the second intermediate node, the method further comprises:
   determining a third communication path from the leaf node to the second gateway node via a third intermediate node; and
   sending at least some of the wireless messages from the leaf node to the second gateway node via the third intermediate node.

5. The method of claim 1, wherein the leaf node information encrypted at the leaf node is encrypted using the leaf node security key before sending the wireless messages to the first and second gateway nodes.

6. The method of claim 2, further comprising:
loading first and second intermediate node security keys into the first and second intermediate nodes, respectively;
communicating first and second intermediate node authentication information from the first and second intermediate nodes, respectively, to the key server, wherein the first and second intermediate node authentication information is prepared using the first and second intermediate node security keys, respectively; and
authenticating the first and second intermediate nodes at the key server using the first and second intermediate node authentication information, respectively.

7. The method of claim 6, wherein the leaf node information encrypted at the leaf node is encrypted using the leaf node security key before sending the wireless messages to the first and second gateway nodes.

8. The method of claim 1, wherein the first gateway node comprises a cache memory, the method further comprising:
receiving at the first gateway node a request from the process data consumer for the leaf node information;
if the leaf node information is not stored in the cache memory of the first gateway node:
sending a request to the leaf node requesting the leaf node information, wherein the wireless messages are received from the leaf node in response to the request from the first gateway node; and
storing the leaf node information from the wireless messages in the cache memory;
if the leaf node information is stored in the cache memory of the first gateway node, retrieving the leaf node information from the cache memory; and
communicating the leaf node information to the process data consumer in response to the request from the process data consumer.

9. The method of claim 1, further comprising:
in response to a failure of at least one of the communication paths and a determination that a single point of failure for communication with the leaf node exists, generating a notice to a system operator identifying the at least one failed communication path and a warning that fully redundant communication pathways can no longer be established.

10. The method of claim 1, further comprising:
exchanging the leaf node information directly between the first and second gateway nodes via a wireless path between the first and second gateway nodes; and
upon a determination, at the second gateway node, that at least one of the wireless messages from the leaf node to the second gateway node is incomplete, using the leaf node information from the first gateway node to complete the at least one of the wireless messages.

11. The method of claim 1, further comprising:
encrypting the leaf node information at the leaf node using an encryption key provided to the leaf node by the key server during an authentication procedure;
wherein decrypting the leaf node information at one or more of the first and second gateway nodes comprises using the key server to decrypt the leaf node information at one or more of the first and second gateway nodes.

12. A system, comprising:
first and second gateway nodes each configured to communicate with a process data consumer and to communicate wirelessly with a leaf node; and
a key server configured to:
communicate with the first and second gateway nodes; and
authenticate the first and second gateway nodes and the leaf node using authentication information received from the first and second gateway nodes and the leaf node,
wherein:
the first gateway node is further configured to determine a first communication path from the leaf node to the first gateway node;
the second gateway node is further configured to determine a second communication path from the leaf node to the second gateway node;
the first and second gateway nodes are further configured to:
load first and second gateway security keys, respectively, the first and second gateway security keys created by the key server;
prepare first and second gateway authentication information using the first and second gateway security keys, respectively;
communicate the first and second gateway authentication information, respectively, to the key server for authentication; and
communicate wirelessly with the leaf node, wherein at least one of the first and second gateway nodes is configured to receive a subscription message from the process data consumer, wherein the subscription message identifies the leaf node, requests information supplied by the leaf node, and requests that the information be published at a first rate;
the leaf node is configured to:
load a leaf node security key created by the key server;
send to at least one of the first and second gateway nodes a wireless leaf node authentication message comprising leaf node authentication information prepared using the leaf node security key; and
repeatedly encrypt leaf node information using the leaf node security key and send, at a second rate, a wireless messages containing the encrypted leaf node information to the first and second gateway nodes;
the first and second gateway nodes are further configured to:
communicate the leaf node authentication information to the key server for authentication;
receive the wireless messages from the leaf node via the first and second communication paths, respectively, at the second rate; and
decrypt the encrypted leaf node information; and
at least one of the first and second gateway nodes is further configured to send the decrypted leaf node information to the process data consumer at the first rate.

13. The system of claim 12, further comprising:
first and second intermediate nodes each configured to communicate wirelessly with at least one of the gateway nodes and with the leaf node;
wherein:
the first intermediate node is further configured to determine the first communication path from the leaf node to the first gateway node via the first intermediate node;
the second intermediate node is further configured to determine the second communication path from the leaf node to the second gateway node via the second intermediate node; and the first and second intermediate nodes are further configured to route the wireless messages from the leaf node to the first and second gateway nodes, respectively.

14. The system of claim 13, wherein:
a third intermediate node is configured to determine the second communication path from the leaf node to the second gateway node via the third intermediate node; and
the third intermediate node is further configured to route the wireless messages from the leaf node to the second gateway node.

15. The system of claim 13, wherein, in response to an error in sending at least one of the wireless messages from the leaf node to the second gateway node via the second intermediate node:
a third intermediate nodes is configured to determine a third communication path from the leaf node to the second gateway node via the third intermediate node; and
the third intermediate node is further configured to route at least some of the wireless messages from the leaf node to the second gateway node.

16. The system of claim 12, wherein the leaf node is further configured to encrypt the leaf node information using the leaf node security key before sending the wireless messages to the first and second gateway nodes.

17. The system of claim 13, wherein:
the first and second intermediate nodes are further configured to:
load first and second intermediate node security keys, respectively;
prepare first and second intermediate node authentication information using the first and second intermediate node security keys, respectively; and
communicate the first and second intermediate node authentication information, respectively, to the key server for authentication; and
the leaf node is further configured to send the wireless leaf node authentication message to the at least one of the first and second gateway nodes via at least one of the first and second intermediate nodes.

18. The system of claim 17, wherein the leaf node is further configured to encrypt the leaf node information using the leaf node security key before sending the wireless messages to the first and second gateway nodes via the first and second intermediate nodes, respectively.

19. The system of claim 12, wherein:
the first gateway node comprises a cache memory; and
the first gateway node is further configured to:
receive a request from the process data consumer for the leaf node information;
if the leaf node information is not stored in the cache memory of the first gateway node:
send a request to the leaf node requesting the leaf node information, wherein the wireless messages are received from the leaf node in response to the request from the first gateway node; and
store the leaf node information from the wireless messages in the cache memory;
if the leaf node information is stored in the cache memory of the first gateway node, retrieve the leaf node information from the cache memory; and
communicate the leaf node information to the process data consumer in response to the request from the process data consumer.

20. A system, comprising:
a key server;
first and second gateway nodes each configured to communicate wirelessly with a leaf node; and
first and second intermediate nodes each configured to communicate wirelessly with at least one of the gateway nodes and with the leaf node;
wherein:
at least one of the first and second gateway nodes is configured to receive a subscription message from a process data consumer, wherein the subscription message identifies the leaf node, requests information supplied by the identified leaf node, and requests that the information be published at a first rate;
the identified leaf node is configured to:
load a security key created by the key server;
repeatedly encrypt leaf node information using the security key and send, at a second rate, wireless messages to the first and second gateway nodes via the first and second intermediate nodes, respectively, wherein each of the wireless messages comprises the encrypted leaf node information; and
the first and second gateway nodes are configured to:
receive the wireless messages sent by the leaf node at the second rate;
decrypt the encrypted leaf node information; and
send the decrypted leaf node information to the process data consumer at the first rate.

21. The system of claim 20, wherein the first and second gateway nodes are further configured to exchange the leaf node information with each other.

* * * * *